June 29, 1954 H. W. BAUMAN 2,682,410

SUPPORT SYSTEM FOR MOVABLE ELEMENTS OF MAGNETIC RECORDING AND REPRODUCING INSTRUMENTS

Filed Nov. 9, 1950 2 Sheets-Sheet 1

Harold W. Bauman
INVENTOR

BY [signature]
[signature]
ATTORNEYS

INVENTOR
Harold W. Bauman
BY
ATTORNEYS

Patented June 29, 1954 2,682,410

UNITED STATES PATENT OFFICE 2,682,410

SUPPORT SYSTEM FOR MOVABLE ELEMENTS OF MAGNETIC RECORDING AND REPRODUCING INSTRUMENTS

Harold W. Bauman, Chicago, Ill.

Application November 9, 1950, Serial No. 194,914

2 Claims. (Cl. 274—4)

The present invention relates to supports for elements of magnetic recording and/or reproducing instruments, which elements are designed to cooperate with such instrument devices as erasing assemblies and magnetic recording and/or reproducing heads, by exerting pressure against them.

Typical elements of the kind in question, and in conjunction with which the invention is hereinafter disclosed, are pressure pads that press a travelling elongate record body against a contacting or guide surface of the corresponding instrument device, and an auxiliary magnetic head shield that partially surrounds such a record body to shield from stray magnetic fields the window of a head-shielding providing contact between the head and record body. Conveniently such elements are supported for movement between advanced positions wherein they exert pressures against the devices with which they are cooperative, and retracted positions wherein they are so spaced from such devices as to permit convenient insertion or removal of a record body. For convenience it is desirable that all such elements be movable between advanced and retracted positions by single movements of a common operator, and to prevent misoperation of the instrument it is preferable that the common operator be the on-off switch that controls operation of a record body-driving motor, so that all the elements are moved to their advanced positions when the motor is turned on, and to their retracted positions when the motor is turned off. The erasing assembly and the magnetic head of a recording and/or reproducing instrument are spaced apart along the record path and both are spaced from the motor switch.

The copending application for United States patent of Edmund Barany and Melvin Sackter, Serial No. 194,915, filed November 9, 1950, discloses and claims an actuating member for a pinch roll-supporting bracket, and mechanism actuated by a motor switch operator for moving the member between positions that are effective to swing the bracket between advanced and retracted positions. The present invention is directed to the problem of supporting one or more pressure-exerting elements of the kinds referred to above on such an actuating member, in such manner that their movement between advanced and retracted positions is correlated with movement of the pinch roll bracket between corresponding positions, and with movement of the motor switch operator to its "on" and "off" positions. The invention also provides for exertion against opposed surfaces of the instrument device, of proper individual pressures by the different elements while in their advanced positions. Still additionally, the invention permits the movement of a single one of several elements, which is associated with an erasing assembly, to be moved to a retracted position while the other elements remain in their advanced positions, a condition that is desirable in a certain type of instrument, as will be described in detail.

A primary object of the invention is the provision of a novel system for supporting plural pressure-exerting magnetic recording and/or reproducing instrument elements upon a pivoted common actuating member, for movement by swinging of the member between advanced positions wherein the individual elements cooperate with various instrument devices spaced along a record body path, by exerting pressure upon them, and retracted positions spaced away from such devices.

Another object is the provision in a magnetic recording instrument that includes an erasing assembly and a magnet head in spaced, successive order in the direction of travel of a record body, of a novel system for supporting upon a common actuator, pivotally mounted in spaced relation from the exit side of the head, a pressure pad for pressing a record body against a contact surface of the erasing head, an auxiliary magnetic head shield that partially surrounds the record body path, to shield a window in a can shield surrounding the head and that extends across the path into pressure-exerting contact with the shield can, and a pressure pad inside the auxiliary shield for pressing a record body against a contact surface of the head, the mounting system being so arranged that when the actuator member is swung to one position all of the pads and shield are spaced from the erasing assembly and head to permit threading, and so that when the actuating member is swung to a second, preselected and definite position the pads and shield are swung into advanced positions and urged to exert pressures on the opposed surfaces of the erasing assembly, head and shield can.

Figure 1:
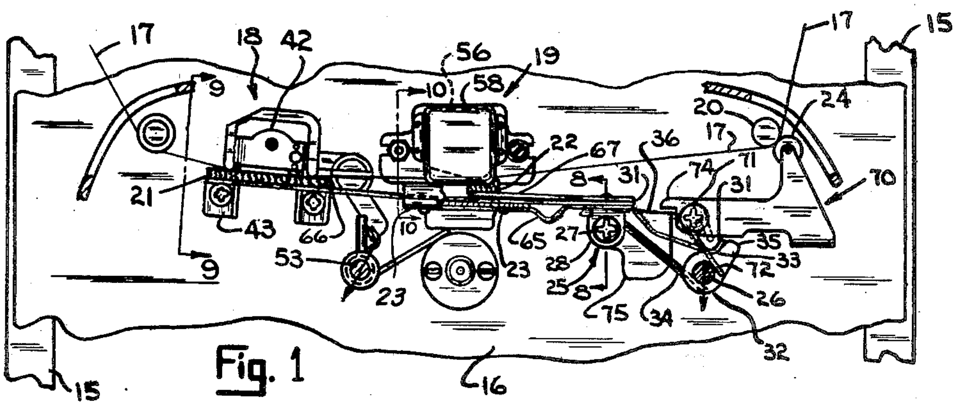
Fig. 1 is a fragmentary top plan of a magnetic recording and reproducing instrument with housing broken away to disclose mechanism embodying the invention.
Figure 6:
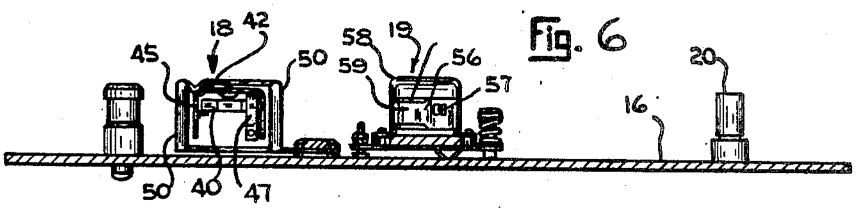
Fig. 6 is a partial section on line 6—6 of Fig. 4.
Figure 7:
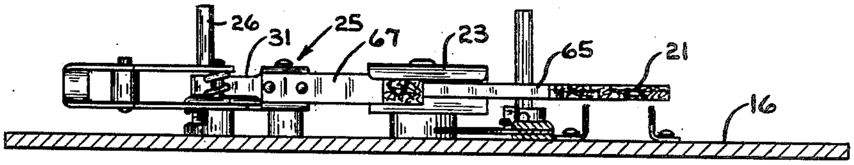
Fig. 7 is a section on line 7—7 of Fig. 4, but with the pinch roll assembly omitted.
Figure 11:
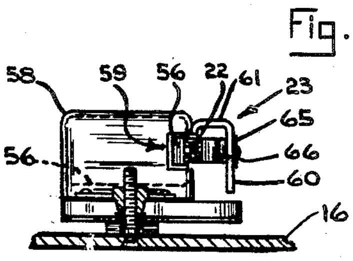
Fig. 11 is a section on line 11—11 of Fig. 3.

Describing the drawings in detail and first referring to Fig. 1, a magnetic recording and reproducing instrument comprises a housing 15 having a cover plate 16. Devices of the instrument that are successively spaced in the direction of travel of a record body, here a tape 17, of magnetizable material, for successive cooperation with such a body, comprise an erasing assembly 18, a magnetic recording and reproducing head 19, and a record body-advancing capstan roller 20. Elements that respectively cooperate with these devices by exerting pressure are, a pressure pad 21 that is to urge the record body against guide surfaces of the erasing assembly 18, a pressure pad 22 and an auxiliary magnetic shield 23 the former of which presses a record body against a contact surface of the head 19 and the latter of which is resiliently urged into contact with a shield can surrounding the head, and a pinch roll 24 that presses the record body against the surface of the capstan roller 20. The elements 21, 22, 23 and 24 are movable from the advanced positions of Fig. 1, contacting surfaces of the devices 18, 19, 20 with which they respectively cooperate and exerting pressure against such surfaces, to the retracted positions of Fig. 4.

Figure 4:
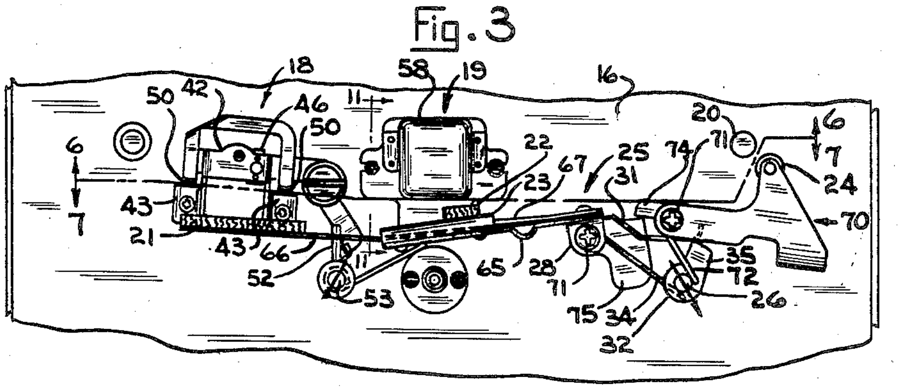
Fig. 4 is a top plan, showing the instrument in condition for threading, with its motor turned off.

As disclosed and claimed in the copending application for United States patent, Serial No. 194,915, filed November 9, 1950, by Edmund Barany and Melvin Sackter, a common actuating member 25 is arranged to be moved between two definite preselected positions, respectively shown in Figs. 1 and 4, by turning of a motor-controlling switch-operating shaft 26 between the "on" position of Fig. 1 and the "off" position of Fig. 4.

Figure 2:
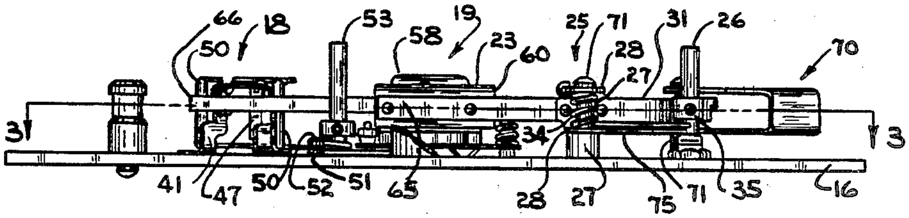
Fig. 2 is a front elevation of the mechanism of Fig. 1.
Figure 3:
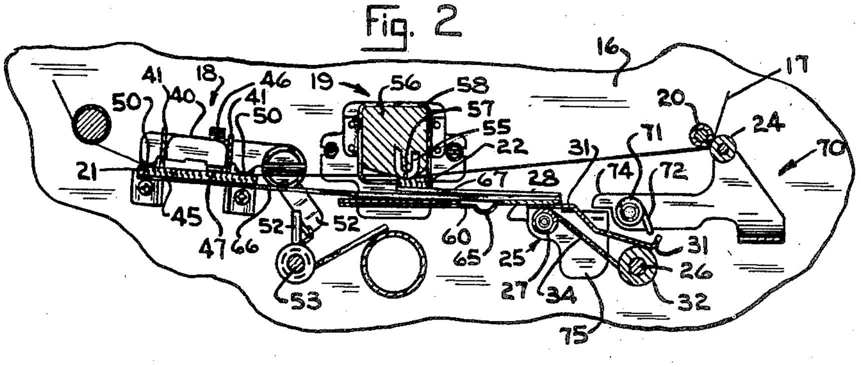
Fig. 3 is a section on line 3—3 of Fig. 2.

The actuating member 25 is mounted for pivoting on a shaft 27 that projects from plate 16. The member comprises a pair of inner and outer spaced arms 28 that rotatably surround shaft 27, the inner arm being spaced from plate 16 by a collar 29, shown in Figs. 2 and 8. A cross reach 30 connects arms 28. This cross reach serves as a mounting for an actuated lever 31 that is secured to its inner surface and that extends for actuation by a cam 32 carried by and rotatable with switch shaft 26. This cam contains a notch or dwell 33 in which a rebent portion of lever 31 engages when the switch shaft 26 is in its "on" position. A spring 34, having an end hooked over the inner actuating member arm 28, a portion coiled about shaft 27 and a second end 34 bearing against shaft 26, biases actuating member, clockwise as seen in Figs. 1, 3 and 4, to maintain lever 31 in contact with the contoured surface of cam 32, and to enter dwell 33 when the switch shaft 26 is in its "on" position. This bias spring 34, the lever 31, and the cam dwell 32 serve to position actuating member 25 in a definite, preselected position when the switch shaft 26 is in "on" position. Cam 32 also has an eccentric or riser portion provided by an arm 35 that serves to swing actuating member 25, counterclockwise as seen in Figs. 1 and 2, to a second position when switch shaft 26 is moved to its "off" position.

The present invention is directed to the problem of supporting pressure pads 21, 22 and auxiliary head shield 23 upon the actuating member 25 in such manner that they will be maintained in spaced relation to the surfaces that they contact of erasing assembly 18 and head 19 when switch shaft 26 is in "off" position and actuating member 25 in its corresponding position, and so that each will be maintained in proper pressure-exerting contact with its cooperating surface when shaft 26 is in "on" position and member 25 in its corresponding position.

Figure 9:
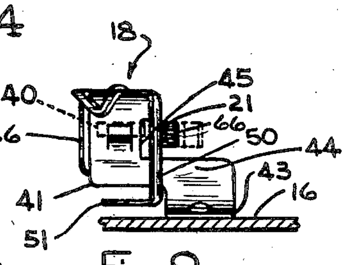
Fig. 9 is a section on line 9—9 of Fig. 1.

The erasing assembly 18 disclosed comprises a permanent magnet 40 (see Figs. 3 and 9) clamped in a bracket structure, all as disclosed and claimed in the application for United States patent, Serial No. 194,917, filed November 9, 1950, by Edmund Barany, Harold W. Bauman and Melvin Sackter. The bracket structure is U-shaped, having side arms 41 and a cross reach 42 connecting them. Mounting feet 43 are offset from side arms 41 by reaches 44 that extend under the record body path and the pressure pad. The side arm 41 at the leading or record-entry side of the bracket has a cut out having an inner surface 45 disposed to permit close approach of a passing record body to a leading pole piece surface 47 of magnet 40, for magnetic saturation of the record body. An inwardly and outwardly adjustable member 46 provides a front surface for selecting the spacing of the record body from the trailing pole piece surface of magnet 40 to just completely demagnetize the magnetized body. The cutout surface 45 and the surface 47 constitute guide surfaces for contact by the record body, and against which the record body is urged by pressure pad 21 when the instrument is in recording condition and a record body is to be acted upon by magnet 40, to demagnetize it prior to recording by head 19.

Figure 5:
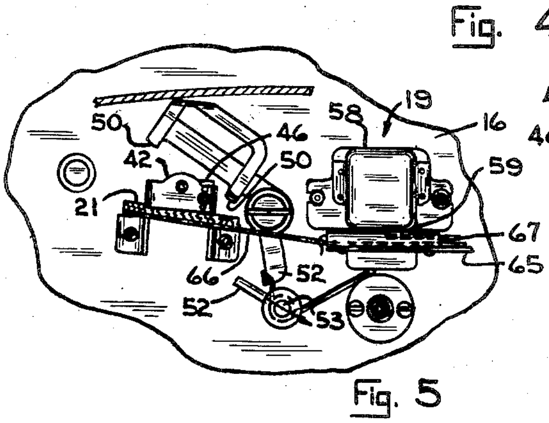
Fig. 5 is a fragmentary view showing the condition of the system of the invention in the recording condition of the instrument.

Erasing assembly 18 also includes mechanism, disclosed and claimed by application for United States patent, Serial No. 194,916, filed November 9, 1950, now Patent No. 2,617,890, by Edmund Barany and Melvin Sackter, for guiding a record body outside the field of erasing effectiveness of magnet 40 when reproduction from the record is to be made. This mechanism comprises a pair of members 50 supported on an arm 51 that is pivoted to plate 16 for moving the members 50 alongside and past the bracket side arms 41 between the retracted positions of Fig. 5, which permit pressure pad 21 to urge the record against the surfaces 45 and 47 for erasing action on the record body, and the advanced positions of Figs. 1, 3 and 4, which space the record body from surfaces 45, 47 to lie outside the region of erasing effectiveness of magnet 40. When in their advanced positions the members 50 provide the erasing assembly guide surfaces against which the record body is urged by pressure pad 21. As disclosed and claimed by application Serial No. 194,916, now Patent No. 2,617,890, arm 51 may be actuated through linkage 52 from a selector switch shaft 53, movable to convert the electronic system of the instrument between recording and reproducing conditions, the linkage being designed to advance and retract members 50 respectively as shaft 53 is moved to convert the instrument to reproducing and recording conditions.

The head assembly 19 includes a head unit that comprises a magnetic circuit element 55 enclosed in a molded body 56 and providing a magnetic gap 57. A head-shielding can 58 of magnetically permeable material surrounds body 56, and has a window 59 through which body 56 is exposed. The surface of body 56 inside window 59 provides a contact surface for guiding a record body, and pressure pad 22, when in its advanced position, urges the record body against that surface.

Figure 10:
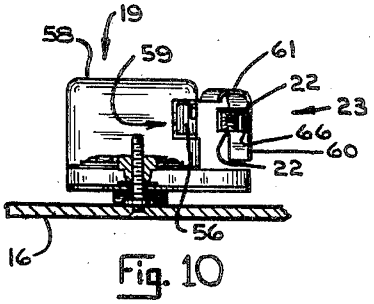
Fig. 10 is a section on line 10—10 of Fig. 1.

Auxiliary magnetic shield 23, which forms the subject matter of application for United States patent, Serial No. 194,823, filed November 9, 1950, by Manuel L. Flata, is arranged when in advanced position to contact and exert pressure against shield can 58, to form therewith a magnetic circuit, and to shield window 59 from stray magnetic fields. The auxiliary magnetic shield 23 is of the general form of an inverted L, having a rear reach 60 that overhangs and masks window 59, and a second reach 61 that extends across and over the record body path into contact with shield can 58 when the shield is in its advanced position. The width of shield reach 61 is such as to provide clearance for pressure pad 22 when the latter and shield 23 are in their advanced positions as shown in Fig. 10.

Figure 8:
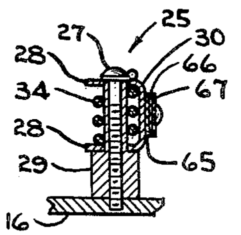
Fig. 8 is a section on line 8—8 of Fig. 1.

The means forming the system of the present invention comprise three flexible resilient elongate bodies, here being strips 65, 66, 67 that have end portions secured to the outer surface of the actuating member cross reach 30, in stacked relation in the order mentioned, and as seen in Fig. 8, and free end portions that respectively are secured to the rear reach 60 of shield 23, the rear surface of pressure pad 21 and the rear surface of pressure pad 22. Each strip has a longitudinal configuration to swing the element it supports clear of plate 16, to maintain the element that it supports in contact with the opposed device surface and urge the element against that surface with proper pressure while actuating member is in its preselected and definite position corresponding to the "on" position of switch shaft 26, and to move the element that it supports to a suitable retracted position when actuating element is moved to its position corresponding to the "off" position of shaft 26.

It will be noted that the intermediate resilient strip 66 that supports pressure pad 21, passes through the auxiliary shield, between the rear reach 60 and strip 67, and under shield reach 61.

As set forth in the above-identified Barany and Sackter application, and as claimed in combination with the present invention in application for United States patent, Serial No. 194,918, filed November 9, 1950, by Edmund Barany, Harold W. Bauman and Melvin Sackter, pinch roll 24 is carried by a bracket 70 that is pivoted on a shaft 71 for swinging the pinch roll between advanced and retracted positions, respectively shown in Figs. 1 and 4. Bracket 70 is biased to advanced position by a spring 72. A projection 74 on bracket 70 is actuated by a nosepiece 75 on the lower arm 28 of actuating member 25 to swing bracket 70 clockwise and move pinch roll 24 to retracted position, when switch shaft 26, in moving from "on" position to "off" position, swings the actuating member counterclockwise from its preselected position corresponding to the "on" position of shaft 26 and the advanced positions of elements 21, 22, 23 and 24.

From the foregoing constructions and arrangements useful for practicing the invention and differing from the specific disclosure herein made will be apparent, and it will be understood that the scope of the invention in question is to be determined by the claims.

I claim:

1. In a magnetic recording and/or reproducing instrument comprising, in successive spaced order in the direction of travel along the path of an elongate magnetizable record body, an erasing assembly having a record body contact surface, and a magnetic head having a record body contact surface and surrounded by a can shield provided with a window exposing said surface; in combination, a common actuating member spaced along the path from the exit side of said head, said member being pivotally mounted and having a surface swingable toward and away from the path by pivotal movement of said member, a pressure pad for pressing a record body against the contact surface of the erase assembly, a second pressure pad for pressing a record body against the contact surface of said head, and an L-shaped auxiliary magnetic shield having a reach for overlying said window on the opposite side of a record body therefrom and a reach for extending across a record body to contact a surface of said shield can, three resilient strips respectively having first portions secured to the rear surfaces of said pressure pads and the first reach of said auxiliary shield and a second portion secured to said actuating member surface, and each of said resilient strips having a longitudinal configuration to support the element secured to its first portion in contact with said erasing assembly, head and shield can surfaces and to be distorted into pressure-exerting relation when the actuating member is in its said preselected position, and said actuating member being pivotally movable to a position wherein said strips are undistorted and the pressure pads and second shield reach are spaced from said surfaces.

2. In a magnetic recording and/or reproducing instrument comprising, in successive spaced order in the direction of travel along the path of an elongate magnetizable record body, an erasing assembly having a record body contact surface, and a magnetic head having a record body contact surface and surrounded by a can shield provided with a window exposing said surface; the combination of claim 1, wherein the resilient strips respectively secured to the auxiliary shield, the first pressure pad and the second pressure pad are secured in successive overlying stacked relation to said actuating member surface, and the strip secured to the first pressure pad extends between the inner side of the first reach of the auxiliary shield and the second pressure pad and the strip secured to the latter.

References Cited in the file of this patent

UNITED STATES PATENTS

| Number | Name | Date |
|---|---|---|
| 2,538,893 | Begun | Jan. 23, 1951 |
| 2,555,643 | Harrison | June 5, 1951 |
| 2,604,549 | Begun | July 22, 1952 |